United States Patent
Wuensche et al.

(10) Patent No.: US 11,139,521 B2
(45) Date of Patent: Oct. 5, 2021

(54) BATTERY SUBMODULE CARRIER, BATTERY SUBMODULE, BATTERY SYSTEM AND VEHICLE

(71) Applicant: Samsung SDI Co., Ltd., Yongin-si (KR)

(72) Inventors: Ralph Wuensche, Graz (AT); Stephan Klomberg, Graz (AT); Thomas Brandner, Rosental (AT); Thomas Renger, Hitzendorf (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 38 days.

(21) Appl. No.: 15/642,167

(22) Filed: Jul. 5, 2017

(65) Prior Publication Data
US 2018/0013113 A1  Jan. 11, 2018

Related U.S. Application Data
(60) Provisional application No. 62/359,520, filed on Jul. 7, 2016.

(51) Int. Cl.
| | | |
|---|---|---|
| H01M 2/10 | (2006.01) | |
| H01M 50/20 | (2021.01) | |

(52) U.S. Cl.
CPC ........ *H01M 50/20* (2021.01); *H01M 2220/20* (2013.01)

(58) Field of Classification Search
CPC .............................. H01M 2/10; H01M 50/20
See application file for complete search history.

(56) References Cited

U.S. PATENT DOCUMENTS

| 8,409,749 B2 | 4/2013 | Nishino et al. |
| 8,507,125 B2 | 8/2013 | Meschter |
| (Continued) | | |

FOREIGN PATENT DOCUMENTS

| CN | 100588001 C | 2/2010 |
| CN | 202174924 U | 3/2012 |
| (Continued) | | |

OTHER PUBLICATIONS

U.S. Office Action dated Feb. 26, 2019, issued in U.S. Appl. No. 15/220,176 (10 pages).
(Continued)

*Primary Examiner* — Karie O'Neill Apicella
(74) *Attorney, Agent, or Firm* — Lewis Roca Rothgerber Christie LLP

(57) ABSTRACT

A battery system includes: a plurality of monolithic cell trays configured to accommodate a plurality of aligned battery cells; a plurality of battery cell retainers configured to retain the battery cells within the cell tray by being connected with the battery cell and the cell tray in each cell tray; a cap-type battery system carrier configured to accommodate the plurality of cell trays; a plurality of tray fasteners provided in each cell tray to mount the cell tray to the battery system carrier by being connected with the cell tray and the battery system carrier; and a cooling channel provided in the battery system carrier to cool the battery cells. Each cell tray includes an opening that exposes the plurality of battery cells, and the cooling channel may be provided in the battery system carrier opposite to the opening of each cell tray.

20 Claims, 9 Drawing Sheets

(56) References Cited

U.S. PATENT DOCUMENTS

| | | | |
|---|---|---|---|
| 8,597,825 | B2 | 12/2013 | Buck et al. |
| 2004/0121226 | A1 | 6/2004 | Kaelin et al. |
| 2010/0015512 | A1 | 1/2010 | Inoue |
| 2011/0070478 | A1 | 3/2011 | Meschter |
| 2011/0104532 | A1 | 5/2011 | Buck et al. |
| 2011/0206967 | A1 | 8/2011 | Itsuki |
| 2012/0082875 | A1 | 4/2012 | Watanabe et al. |
| 2012/0156539 | A1 | 6/2012 | Honjo et al. |
| 2012/0263988 | A1 | 10/2012 | Obasih et al. |
| 2013/0004822 | A1 | 1/2013 | Hashimoto et al. |
| 2013/0071705 | A1 | 3/2013 | Frutschy et al. |
| 2014/0158443 | A1* | 6/2014 | Lee .............. B60R 16/04 180/68.5 |
| 2014/0158444 | A1 | 6/2014 | Han et al. |
| 2014/0186683 | A1 | 7/2014 | Tyler et al. |
| 2015/0017502 | A1 | 1/2015 | Brenner et al. |
| 2015/0064542 | A1 | 3/2015 | Noh et al. |
| 2015/0069829 | A1* | 3/2015 | Dulle .............. B60L 50/16 307/9.1 |
| 2015/0280193 | A1 | 10/2015 | Ohshiba et al. |
| 2015/0303534 | A1* | 10/2015 | Obasih .......... H01M 10/6556 429/120 |
| 2016/0118635 | A1 | 4/2016 | Keller et al. |
| 2016/0190526 | A1* | 6/2016 | Yamada .......... H01M 2/1083 180/68.5 |
| 2017/0237113 | A1 | 8/2017 | Ruehle et al. |

FOREIGN PATENT DOCUMENTS

| | | | | |
|---|---|---|---|---|
| CN | 102569692 A | * | 7/2012 | .............. B60K 1/04 |
| CN | 102569692 A | | 7/2012 | |
| CN | 102856516 A | | 1/2013 | |
| CN | 103718374 A | * | 4/2014 | ......... H01M 10/6556 |
| CN | 103718374 A | | 4/2014 | |
| CN | 104425782 A | * | 3/2015 | ............. H01M 50/40 |
| CN | 104425782 A | | 3/2015 | |
| CN | 105390636 A | | 3/2016 | |
| CN | 105390636 A | * | 3/2016 | .......... H01M 10/613 |
| CN | 105552261 A | * | 5/2016 | ............. H01M 50/20 |
| CN | 105552261 A | | 5/2016 | |
| CN | 105742531 A | | 7/2016 | |
| DE | 10-2011-077331 A1 | | 12/2012 | |
| JP | 2010-61908 A | | 3/2010 | |
| JP | 2011-181224 A | | 9/2011 | |
| JP | 2012-123917 A | | 6/2012 | |
| JP | 2012-128984 A | | 7/2012 | |
| JP | 2012-129074 A | | 7/2012 | |
| JP | 2012-216328 A | | 11/2012 | |
| JP | 2013-12441 A | | 1/2013 | |
| JP | 2013-12480 A | | 1/2013 | |
| JP | 2014-22157 A | | 2/2014 | |
| JP | 2016-81857 A | | 5/2016 | |
| KR | 0121488 Y1 | | 4/1998 | |
| KR | 10-2011-011651 A | | 2/2011 | |
| KR | 10-2013-0102964 | | 9/2013 | |
| KR | 10-2013-0108691 | | 10/2013 | |
| KR | 20130108691 A | * | 10/2013 | ............ H01M 10/02 |
| KR | 10-2015-0026609 | | 3/2015 | |
| WO | 2012/165493 A1 | | 12/2012 | |
| WO | 2012165493 A1 | | 12/2012 | |

OTHER PUBLICATIONS

EPO Office Action dated Sep. 13, 2018, for corresponding European Patent Application No. 16200634.0 (13 pages).
EPO Extended Search Report dated Sep. 8, 2017, for corresponding European Patent Application No. 16200634.0 (17 pages).
Korean Notice of Allowance dated Jul. 20, 2018, for corresponding Korean Patent Application No. 10-2016-0142174 (3 pages).
International Search Report and Written Opinion of the International Searching Authority dated Oct. 18, 2017, of corresponding PCT Application No. PCT/KR2017/007240, 12 pages.
Korean Office Action dated Jan. 16, 2018, for corresponding Korean Patent Application No. 10-2016-0142174 (11 pages).
EPO Partial Search Report dated May 10, 2017, for corresponding European Patent Application No. 16200634.0 (20 pages).
European Patent Office Communication Pursuant to Article 94(3) EPC, for Patent Application No. EP 16 200 634.0, dated May 20, 2019, 8 pages.
Japanese Office Action dated Feb. 3, 2020, for corresponding Japanese Patent Application No. 2018-568413 (6 pages).
EPO Extended Search Report dated Feb. 6, 2020, for corresponding European Patent Application No. 17824558.5 (9 pages).
U.S. Office Action dated Dec. 31, 2019, issued in U.S. Appl. No. 15/220,176 (9 pages).
Office action issued in U.S. Appl. No. 15/220,176, dated Jun. 25, 2020, 15 pages.
Chinese Office Action, with English translation, dated Dec. 31, 2020, for corresponding Chinese Patent Application No. 201780042273.4 (28 pages).
Advisory Office Action issued in U.S. Appl. No. 15/220,176 by the USPTO, dated Oct. 3, 2019, 4 pages.
Advisory Office Action issued in U.S. Appl. No. 15/220,176 by the USPTO, dated Oct. 1, 2020, 5 pages.
Final Office Action issued in U.S. Appl. No. 15/220,176 by the USPTO, dated Jun. 17, 2019, 10 pages.
Restriction Requirement Office Action issued in U.S. Appl. No. 15/220,176 by the USPTO, dated Sep. 7, 2018, 6 pages.
Japanese Office Action dated Nov. 2, 2020, corresponding to Japanese Patent Application No. 2016-228790 (8 pages).
U.S. Office Action dated Nov. 13, 2020, issued in U.S. Appl. No. 15/220,176 (10 pages).
U.S. Notice of Allowance dated Mar. 18, 2021, issued in U.S. Appl. No. 15/220,176 (10 pages).
Chinese Office Action, with English translation, dated Apr. 25, 2021, issued in corresponding Chinese Patent Application No. 201611063863.9 (17 pages).

* cited by examiner

BATTERY SUBMODULE CARRIER, BATTERY SUBMODULE, BATTERY SYSTEM AND VEHICLE

CROSS-REFERENCE TO RELATED APPLICATION

This application claims priority to and the benefit of U.S. patent application Ser. No. 62/359,520 filed in the USPTO on Jul. 7, 2016, the entire contents of which are incorporated herein by reference.

BACKGROUND OF THE INVENTION

1. Field

Embodiments of the present invention relate to a battery submodule carrier, a battery submodule with such a battery submodule carrier, a battery system with such a battery submodule, and a vehicle with such a battery system.

2. Description of the Related Art

A rechargeable (or secondary) battery differs from a primary battery in that the former is designed to be repeatedly charged and discharged while the latter provides an irreversible conversion of chemical to electrical energy. Low-capacity rechargeable batteries are used as power supplies for small electronic devices, such as cellular phones, notebook computers, and camcorders, while high-capacity rechargeable batteries are used as power supplies for hybrid vehicles and the like.

In general, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case in order to enable charging and discharging of the battery via an electrochemical reaction between the positive electrode, the negative electrode, and the electrolyte solution. The shape of the case, for example, a cylindrical or rectangular shape, depends on the intended purpose of the battery.

Rechargeable batteries may be used in a battery module including a plurality of unit battery cells coupled to each other in series and/or in parallel so as to provide relatively high energy density for, as an example, driving a motor of a hybrid vehicle. For example, the battery module is formed by interconnecting the electrode terminals of the plurality of unit battery cells to each other, the number of unit battery cells depending on a desired amount of power, in order to realize a relatively high-power rechargeable battery module for, as an example, an electric vehicle.

Battery modules can be constructed in a block design or in a modular design. In the block design, each battery cell is coupled to one common current collector structure and battery management system, and the batteries are arranged in a housing. In the modular design, a plurality of battery cells are connected in submodules, and several submodules are connected to each other to form the module. In the modular design, different battery management functions can be realized on a module or submodule level, which provides favorable aspects, such as improved interchangeability.

To form a battery system, one or more battery modules are mechanically and electrically integrated, equipped with a thermal management system, and configured to communicate with one or more electrical consumers. Further, the battery system may include an electronics assembly, such as a battery management unit (BMU) and/or a battery disconnect unit (BDU).

The above information disclosed in this Background section is only for enhancement of understanding of the background of the invention and therefore it may contain information that does not form the prior art that is already known in this country to a person of ordinary skill in the art.

SUMMARY

An exemplary embodiment of the present invention provides a battery submodule carrier that is strong to vibration, impact, and deformation of the battery cell, can simply fix battery cells during assembling/driving, and can cool the battery cells, a battery submodule including the battery submodule carrier, a battery system including the battery submodule, and a vehicle including the battery system.

One or more of the drawbacks of the prior art are avoided or reduced by a battery submodule carrier, a battery submodule, a battery module, and a vehicle according to embodiments of the present invention.

A battery system according to an an exemplary embodiment of the present invention includes: a plurality of monolithic cell trays configured to accommodate a plurality of aligned battery cells, a plurality of battery cell retainers configured to retain the battery cells within the cell tray by being connected with the battery cell and the cell tray in each cell tray; a cap-type battery system carrier configured to accommodate the plurality of cell trays, a plurality of tray fasteners provided in each cell tray to mount the cell tray to the battery system carrier by being connected with the cell tray and the battery system carrier; and a cooling channel provided in the battery system carrier to cool the battery cells. Each cell tray includes an opening that exposes the plurality of battery cells, and the cooling channel may be provided in the battery system carrier opposite to the opening of each cell tray.

The cooling channel may be provided at an outer side of the carrier.

The battery system carrier may include a plurality of longitudinal beams disposed at an arbitrary interval, a plurality of crossbeams disposed crossing the plurality of longitudinal beams at an arbitrary interval, a ground plate including a bottom that is formed by a combination body of the plurality of longitudinal beams and the plurality of crossbeams and support beams connected with the ground plate and the plurality of longitudinal beams or the ground plate and the plurality of crossbeams, wherein the coolant channel includes a plurality of coolant pipes provided in the ground plate.

The plurality of coolant pipes may be connected to injection distribution pipes and exhaust distribution pipes that are provided in the ground plate.

The coolant pipes may be disposed along the crossbeams, and the injection distribution pipes and the exhaust distribution pipes are disposed along the longitudinal beams.

The opening of the cell tray may be a central opening provided in a bottom surface of the tray along a longitudinal direction of the tray, and the coolant channels are aligned while respectively matching the central openings of the respective cell trays.

The battery submodule carrier according to some embodiments of the present invention includes the monolithic cell tray, and thus assembly of a battery submodule basically consists of inserting the secondary battery cells into the monolithic cell tray. Thus, assembling of the battery submodule is relatively fast and easy.

Further, in some embodiments, the battery cells are configured to be retained in the cell tray via the cell retainers. In some embodiments, the cell retainers are configured to retain the plurality of all of the secondary battery cells inserted into the cell tray at once. In some embodiments, the cell retainers are configured to retain individual battery cells or groups (e.g., groups of 2-4 battery cells) of the plurality of battery cells accommodated in the cell tray. Thus, failed battery cells can be removed and replaced individually or by removing a relatively small number of the secondary battery cells.

In some embodiments, the cell tray of the battery submodule carrier is configured to accommodate a plurality of prismatic battery cells, each of the battery cells having two opposing wide side surfaces, two opposing narrow side surfaces, and opposing top and bottom surfaces. The battery system carrier provides mechanical integrity and stability to the battery module. In some embodiments, the tray fasteners are configured for assembling a plurality of the cell trays filled with the battery cells to each other in order to form a battery module. To provide a lightweight and easy to manufacture cell tray, in some embodiments, the battery module may include a battery system carrier to provide improved mechanical integrity. The tray fasteners may include one or more protrusions extending from one or more surfaces of the cell tray (e.g., side surfaces of the cell tray) and may include connectors (e.g., screw holes and/or hooks) to be coupled to corresponding connectors of the battery system carrier.

In some embodiments, the cell tray, the cell retainers, and the tray fasteners are a monolithic unit. For example, a one-block component is configured to accommodate a plurality of aligned battery cells, to retain the battery cells therein, and to be mounted to a battery system carrier. Thus, the assembly and disassembly of battery submodules and battery modules is relatively simple and quick. In some embodiments, the cell tray, the cell retainers, and the tray fasteners are injection molded from an electrically nonconductive polymeric material or may be made of a light-weight material such as carbon fiber or reinforced plastic. Thus, the submodule carrier can be easily and cost-effectively manufactured in large quantities and essentially in a one-step process. In these embodiments, material costs and costs for manufacturing the battery submodule carrier, battery submodules, and modules are reduced.

In some embodiments, the cell tray of the battery submodule carrier is configured to accommodate a plurality of prismatic battery cells. Each of the battery cells has two opposing wide side surfaces, two opposing narrow side surfaces, and opposing top and bottom surfaces. The plurality of battery cells may be stacked together with their wide surfaces facing each other. Such stacking of the prismatic battery cells provides an essentially rectangular shape. For example, the cell tray according to embodiments of the present invention is configured to accommodate a rectangular block of stacked secondary battery cells. In some embodiments, each cell tray is configured to receive one stack of secondary battery cells. For the sake of material efficiency, the cell tray may also have an essentially rectangular shape. Battery submodule carriers according to these embodiments are space-saving, and a plurality of battery submodule carriers can be easily arranged in a common plane or stacked above each other in multiple levels.

In some embodiments, the cell tray of the battery submodule carrier has an essentially U-shaped cross section that is configured to accommodate, along a width direction thereof, a plurality of prismatic battery cells. For example, the cell tray is configured to accommodate the battery cells by inserting them through the open side of the U-shaped cross section. For example, the cell tray is configured to accommodate the battery cells by inserting them into the cell tray in a direction perpendicular to the stacking direction of the resulting stack of the battery cells. The snuggly-fitting side walls of the cell tray are configured to provide retaining forces onto the cells, and thus, the cell tray can be relatively compact. Further, the cell tray may be formed in the shape of a box that includes a bottom surface including a central opening and a top opening that faces the central opening.

In some embodiments of the battery submodule carrier, the cell tray includes a bottom surface having a central opening that extends along a longitudinal direction of the cell tray (e.g., along the stacking direction of the plurality of stacked battery cells). In the cell tray having the essentially U-shaped cross section, the bottom surface is the surface opposite to the open side of the U-shape. By providing the central opening, material costs and weight of the cell tray can be further reduced. The central opening can further provide a vent route aligned with vent openings of the battery cells or provide a cooling interface (e.g., to allow the accommodated battery cells to be in close contact with a coolant channel).

In some embodiments, the cell tray includes a bottom surface including a first ledge perpendicularly protruding inwardly from a first side surface of the cell tray and a second ledge perpendicularly protruding inwardly from a second side surface of the cell tray. For example, the cell tray has an essentially H-shaped cross section having two ledges protruding inwardly from the long legs of the H-shape and being essentially parallel to the horizontal line of the H-shape. In some embodiments, the first ledge and the second ledge are configured to support a plurality of the aligned prismatic battery cells. For example, the first ledge and the second ledge together provide sufficient mechanical support to hold the plurality of battery cells accommodated in the cell tray, at least in one direction.

In some embodiments of the battery submodule carrier, the cell tray includes a first side surface and a second side surface. The first side surface is configured to extend along first narrow side surfaces of the plurality of battery cells (e.g., along the plurality of first narrow side surfaces of battery cells accommodated in the cell tray). The first side surface has a first lower portion configured to cover the first narrow side surfaces and a first upper portion. The second side surface is configured to extend along second narrow side surfaces of the plurality of battery cells (e.g., along the plurality of second narrow side surfaces of battery cells accommodated in the cell tray). The second side surface has a second lower portion configured to cover the second narrow side surfaces and a second upper portion. At least one of the upper portions of the side surfaces (e.g., at least one of the first upper portion and the second upper portion) includes spaced apart snap segments extending upwardly from the respective lower portion. Each of the snap segments is elastically connected to the respective lower portion and is configured as a cell retainer by providing a clip closure with at least one of the battery cells accommodated in the cell tray.

In some embodiments, the elastic connection is provided by a local necking of the respective side surface at the transition from the lower portion into the snap segment. In some embodiments, the clip closure is provided by the snap segments including protruding features that are shape-fitted to gaps or recesses in the cases of the secondary battery cells, such as in the top sides of the secondary battery cells. In some embodiments, the snap segments have a first segment and a second segment. The first segment may be essentially parallel to the side surface of the cell tray and may extend essentially along a narrow side surface of the battery cell accommodated in the cell tray. Alternatively, the first segment may be essentially parallel to the side surface of the cell tray or may extend essentially along a narrow side surface of the battery cell accommodated in the cell tray.

The second segment may be angled with respect to the first segment, may extend generally along a top surface of the battery cell accommodated by the cell tray, and/or may contact the top surface of the battery cell accommodated by the cell tray. Alternatively, the second segment may extend generally along a top surface of the battery cell accommodated by the cell tray, and/or may contact the top surface of the battery cell accommodated by the cell tray. The second segment may include a protruding hook that interlocks with a corresponding feature on the top side of the accommodated battery cell. In some embodiments, the cell tray is manufactured with preloaded snap segments that are configured to bend to permit insertion of the secondary battery cell into the cell tray. The snap segment is configured to retain the inserted battery cell in its neutral position.

In some embodiments of the battery submodule carrier, the cell tray includes a first end surface configured to cover or substantially cover a wide side surface of a first outermost battery cell and a second end surface configured to cover or substantially cover a wide side surface of a second outermost battery cell. At least one of the first end surface and the second end surface may include a reinforcing structure. However, in some embodiments, the side surfaces and the bottom surface of the cell tray may include reinforcing structures. The cell tray may be configured to fix the battery cells and other parts during assembly and operation, while mechanical loads are supported by the battery's frame and/or by the battery system carrier.

However, in some embodiments, the cell tray itself is configured to absorb mechanical loads. The cell tray may absorb kinetic energy in the event of an impact, for example, during a vehicle crash. Battery cells should also be restricted from swelling or excessively swelling. The cell tray may include reinforcing structures to absorb the swelling or to restrict the swelling. In some embodiments, the reinforcing structure is a honeycomb structure.

Another embodiment of the present invention provides a battery submodule including a battery submodule carrier according to an embodiment of the present invention and a plurality of the aligned battery cells in the cell tray. In some embodiments, the battery cells are retained in the cell tray by the cell retainers that are, in some embodiments, monolithic with the cell tray.

Another embodiment of the present invention provides a battery system including a battery system carrier and the plurality of battery submodules as described above (e.g., a plurality of the battery submodules including the battery submodule carrier according to an embodiment of the present invention). The tray fasteners may be attached to the battery system carrier. In some embodiments, the tray fasteners are monolithic with the cell tray. The battery system carrier is configured to improve the mechanical integrity of the plurality of battery submodules and may further include compartments for a battery management system, components for interconnecting the battery submodules, external ports to contact the submodules, and components for attaching the module carrier to another structure, for example, to a vehicle.

In some embodiments of the battery system, the battery system carrier includes a plurality of longitudinal beams and a plurality of crossbeams. The longitudinal beams and the crossbeams constitute a carrier frame. The module carrier may further include a ground plate attached to the carrier frame. In other embodiments, a bottom side of the battery system is formed by the bottom sides of the cell trays of the plurality of battery submodules. The battery system carrier may further include a plurality of support beams that are attached to the ground plate and/or to the longitudinal beams or the crossbeams. The crossbeams may be parallel to the longitudinal beams or the crossbeams. According to these embodiments, the tray fasteners are attached to the support beams. In some embodiments, each battery submodule in the battery system is arranged between two adjacent support beams and each submodule includes tray fasteners protruding outwardly from both side surfaces of the cell tray.

In some embodiments of the battery system, a coolant channel is integrally formed in the ground plate of the battery system or is attached to the ground plate of the battery system. The coolant channel forms multiple cooling areas (e.g., heat exchange areas) which may include a plurality of windings of the coolant channel. In some embodiments, each submodule may include a cell tray that has a bottom surface having a central opening extending along a longitudinal direction of the cell tray. In some embodiments, each of the central openings is aligned with one of the cooling areas to form a cooling interface for the respective battery submodule. In some embodiments, the battery system may include one cooling area for each battery submodule.

Another embodiment of the present invention provides a vehicle including a battery system according to an embodiment of the present invention as described above, a battery submodule according to an embodiment of the present invention as described above, and/or a battery submodule carrier according to an embodiment of the present invention as described above.

Further aspects of the present invention will become apparent from the attached drawings and/or the following description of the attached drawings.

According to the exemplary embodiments of the present invention, assembling of the battery submodule is relatively fast and easy. In addition, failed battery cells can be removed and replaced individually or by removing a relatively small number of the secondary battery cells. Further, the battery module provides a battery system carrier that can provide mechanical integrity and stability such that a lightweight and easy to manufacture cell tray can be provided. In addition, the submodule carrier can be easily and cost-effectively manufactured in large quantities and essentially in a one-step process. Battery submodule carriers may be space-saving because a plurality of battery submodule carriers can be easily arranged in a common plane or stacked above each other in multiple levels. The cell tray itself is configured to absorb mechanical loads, and thus the cell tray may protect the battery by absorbing kinetic energy in the event of an impact, for example, during a vehicle crash. In addition, the coolant channel of the battery system carrier may be integrally formed in the ground plate of the battery system and may provide a wide heat exchange area by forming a plurality of spirally wound coolant channels.

BRIEF DESCRIPTION OF THE DRAWINGS

Features of the present invention will become apparent to those of ordinary skill in the art by describing, in detail, exemplary embodiments thereof with reference to the attached drawings, in which.

DETAILED DESCRIPTION

Figure 1:
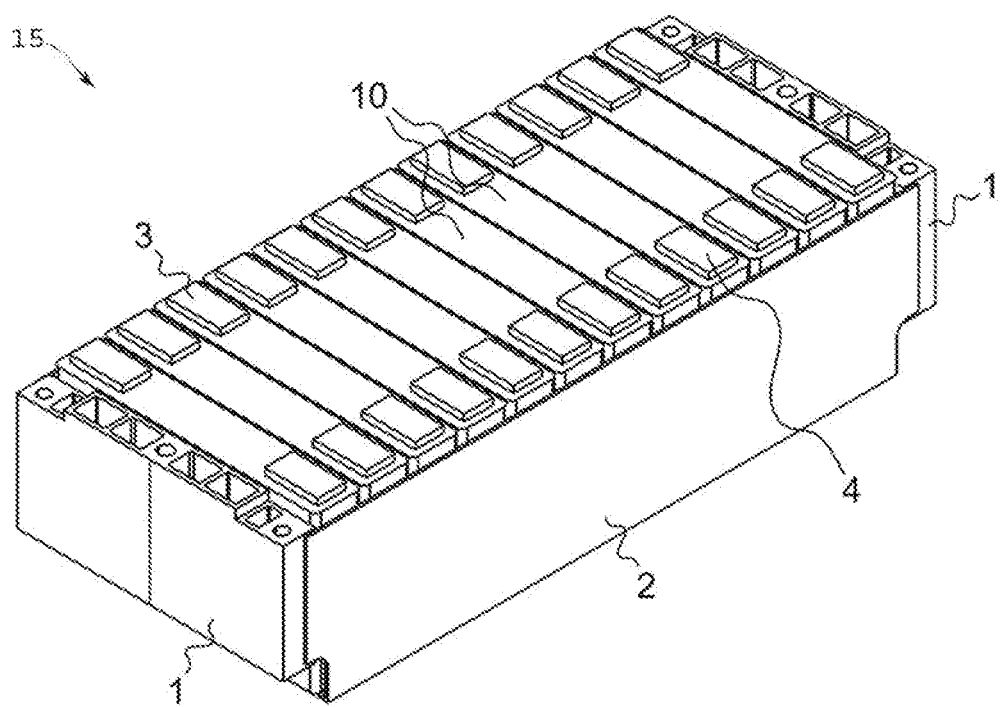
FIG. 1 is a perspective view of a typical battery submodule.

Hereinafter, example embodiments of the present invention will be described in more detail with reference to the accompanying drawings. The present invention, however, may be embodied in various different forms, and should not be construed as being limited to only the illustrated embodiments herein.

Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity and ease of description. In addition, in the drawings, thickness of layers and regions are exaggerated for ease of description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, the word "over" or "on" means positioning on or below the object portion, but does not essentially mean positioning on the upper side of the object portion based on a gravity direction.

In addition, unless explicitly described to the contrary, the word "comprise" and variations such as "comprises" or "comprising", will be understood to imply the inclusion of stated elements but not the exclusion of any other elements.

For the electrical integration in a battery module having the modular design, either submodules including a plurality of cells connected to each other in parallel are connected to each other in series (XsYp) or submodules including a plurality of cells connected to each other in series are connected to each other in parallel (XpYs). XsYp-type submodules can generate relatively high voltages, but the voltage level of each individual cell has to be individually controlled. Thus, wiring complexity is relatively high in XsYp-type submodules. In XpYs-type submodules, the voltage levels of the cells connected to each other in parallel are automatically balanced, and thus, it is sufficient to control the voltage on the submodule level. Thus, wiring complexity is reduced in XpYs-type submodules. In the submodules of cells connected to each other in parallel, their capacitance adds up, and thus, XpYs-type submodules are generally used with low capacitance cells. The thermal management system allows for safe use the battery module by efficiently emitting, discharging, and/or dissipating heat generated by the rechargeable batteries. If the heat emission/discharge/dissipation is not sufficiently performed, temperature deviations occur between the respective battery cells, such that the battery module cannot generate a desired amount of power. In addition, an increase of internal temperatures of the rechargeable batteries can lead to abnormal reactions occurring therein, thus causing charging and discharging performance of the rechargeable batteries to deteriorate and the life-span of the rechargeable batteries to be shortened. Thus, cooling devices for effectively emitting/discharging/dissipating heat from the cells are often provided.

To meet the dynamic power demands of various electrical consumers (e.g., electrical consumption circuits or devices) connected to the battery system, static control of battery power output and charging may not be sufficient. Thus, a steady exchange of information between the battery system and the controllers of the electrical consumers may be implemented. Important information, such as the battery system's actual state of charge (SoC), potential electrical performance, charging ability, and internal resistance, as well as actual or predicted power demands or surpluses of the consumers, may be communicated. Mechanical integration of the battery module refers to mechanical connections of the individual components among themselves and to a structure of the powered system (e.g., the system providing the electrical information, such as a vehicle). These connections should be designed such that they remain functional and safe during the average service life of the battery system and under the stresses endured during use of the powered device (e.g., the vehicle). Also, installation space and interchangeability requirements should be considered, especially in mobile applications.

Mechanical integration of battery modules can be achieved by providing a carrier plate (e.g., a ground plate) and by positioning individual battery cells or submodules thereon. Fixing the battery cells or submodules to the carrier plate can be achieved by fitting the battery cells or submodules into depressions in the carrier plate, by mechanical interconnectors, such as bolts or screws, or by confining the cells or submodules. Confinement can be achieved by fastening side plates to lateral sides of the carrier plate and/or by providing a second carrier plate atop the battery cells or submodules and fixing it to the first carrier plate and/or side plates. Thus, multilevel battery modules can be constructed, and the carrier plates and/or side plates may include coolant ducts to cool the cells or submodules.

Mechanical integration of battery submodules may generally be achieved by preassembling a plurality of battery cells and connecting them to each other with mechanically reinforced electrical connectors, by fastening side and/or front plates around the battery cells, or by attaching carrier beams or struts to the electrical connectors and to the battery cells.

Referring to FIG. 1, a battery submodule 15 includes a plurality of aligned battery cells 10, each having a substantially prismatic shape. Each of the battery cells 10 includes a positive terminal 3, a negative terminal 4, and a vent opening (e.g., a vent hole). A pair of module front plates 1 is provided to face front surfaces (e.g., wide surfaces) of the battery cells 10 (e.g., to face front surfaces of the outermost ones of the battery cells 10). The module front plates 1 are mechanically coupled to a pair of module side plates 2 that face side surfaces (e.g., narrow side surfaces) of the battery cells 10. The module front plates 1 and the module side plates 2 are assembled to each other to fix the plurality of battery cells 10 together. Thereby the plurality of battery cells 10 is fixed together. The battery submodule may further include a pair of module top plates that are mechanically coupled to the module front and side plates 1, 2. The module front plates 1, the module side plates 2, and the module top plates together provide a self-supporting body of the battery submodule 15.

The number of battery cells in usual battery modules can reach several hundred cells, and thus, a relative great number of battery submodules may be included in the battery module. The effort to assemble the plurality of battery submodules prior to assembling the battery module is a material and time-intensive process that increases the manufacturing costs of the battery module. Further, the failure and subsequent replacement of a single battery cell in the battery module requires removal of the battery submodule from the battery module and disassembly of the battery submodule, such that the battery module loses its mechanical integrity during that process.

Figure 2:
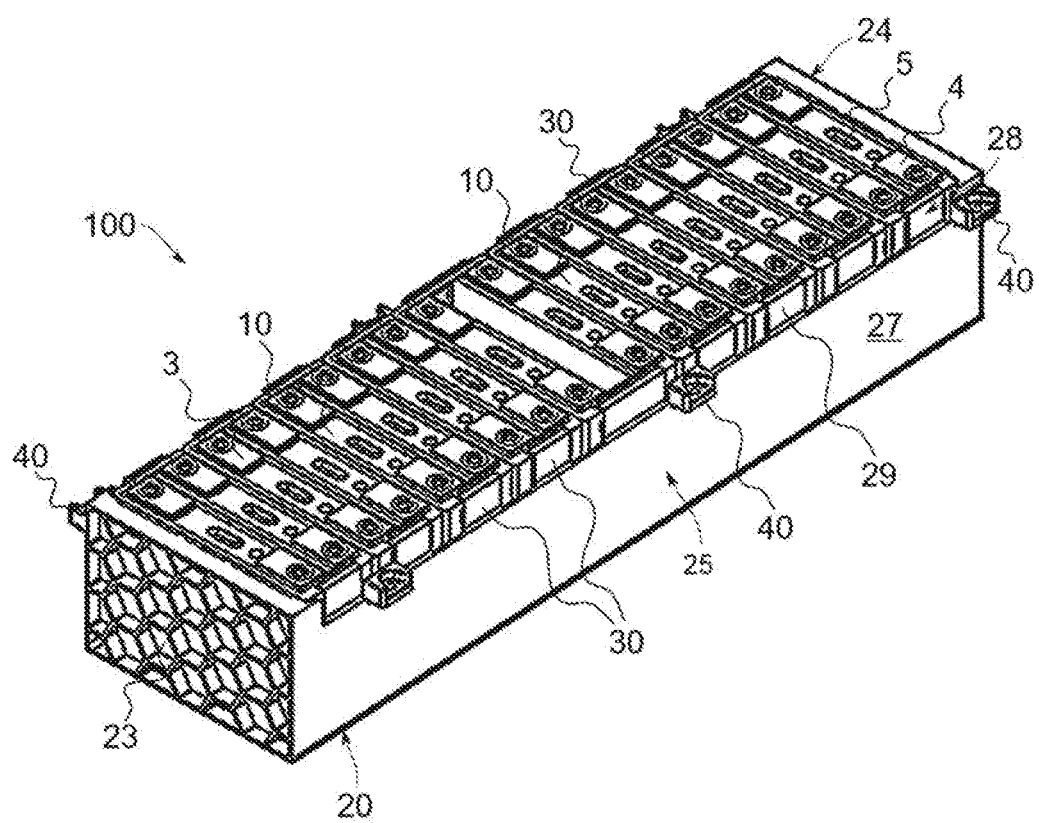
FIG. 2 is a perspective view of a battery submodule according to an embodiment of the present invention.

Referring to FIG. 2, an exemplary embodiment of a battery submodule 100 according to the present invention includes a plurality of aligned battery cells 10, each having a substantially prismatic shape, that are inserted into (or accommodated in) a battery submodule carrier. As shown in FIG. 2, each of the battery cells 10 is prismatic (or rectangular) cell, and wide, flat side surfaces of the cells 10 are stacked together (e.g., are stacked to face each other) to form the battery submodule 100. A plurality (e.g., several to several tens) of battery cells 10 form one group, and at least two groups may be aligned in the battery submodule carrier. In the present exemplary embodiment, nine battery cells 10 form one group, and two groups are arranged in the battery submodule carrier. A barrier rib may be provided between the two groups. Further, each of the battery cells 10 includes a battery case configured to accommodate an electrode assembly and an electrolyte. The battery case is hermetically sealed and is provided with positive and negative electrode terminals 3 and 4 having different polarities from each other and a vent opening 5 (e.g., a vent hole). The vent opening 5 is a safety device of the battery cell 10 and acts as a passage through which gas generated in the battery cell 10 is exhausted to the outside of the battery cell 10. In order to avoid any unwanted electric contact between the individual battery cells 10, isolation foils are disposed between adjacent ones of the battery cells 10.

The battery submodule carrier includes a cell tray 20 having a first side surface (e.g., a wide surface) 25 and an opposite second side surface 26, a first end surface 23 and an opposite second end surface 24, an open top surface (e.g., an open top side) and a bottom surface. The cell tray 20 where the battery cells 10 are accommodated may substantially have a U-shaped cross-section. The first side surface 25 includes a lower portion 27 covering the narrow side surfaces of the battery cells 10 that are inserted in the cell tray 20, and further includes an upper portion 28 including (e.g., consisting of) a plurality of cell retainers 30, such as spaced apart snap segments 29. Thus, the upper portion 28 of the first side surface 25 is segmented by hook-shaped snap segments 29 that extend to the upper portion 28 and are elastically connected to the lower portion 27, and recesses are formed between adjacent snap segments 29. The second side surface 26 includes a structure similar to the first side surface 25. The submodule battery carrier further includes tray fasteners 40 that protrude from the side surfaces (e.g., from the first side surface 25 and the second side surface 26) of the cell tray 20 and, in some embodiments, are positioned at the transition between the lower portion 27 and the upper portion 28 of the side surfaces 25, 26. The tray fasteners 40 may include screw holes that are configured to be aligned with corresponding connectors, such as screws, of a battery system carrier.

Figure 3:
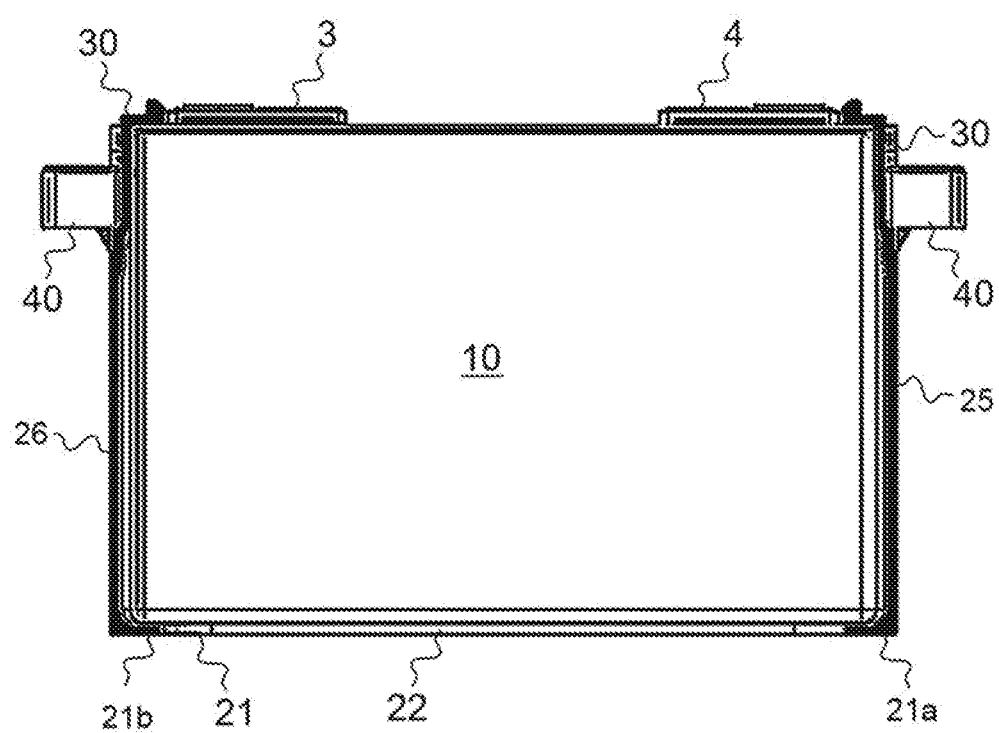
FIG. 3 is a cross-sectional view of a battery submodule according to an embodiment of the present invention.

Referring to FIGS. 2 and 3, the battery cells 10 are inserted into the cell tray 20 through the open top side such that the wide side surfaces of the battery cells 10 are adjacent to each together, and the battery cells 10 are retained in the cell tray 20 by the snap segments 29. The snap segments 29 are formed, pre-stressed, from the side walls 25, 26 (e.g., side surfaces) of the cell tray 20 and are configured to bend away (e.g., to bend away from an accommodation space for the battery cells 10 in the cell tray 20) for the battery cells 10 to be inserted into the cell tray 20.

In their neutral position (i.e., positions before the battery cells are inserted into the cell tray), the snap segments 29 retain the battery cells 10. Therefore, the snap segments 29 include a first segment extending generally along the side surface of the battery cells and a second segment protruding inwardly from the first segment that generally extends along the top surface of the battery cells 10. In the embodiment illustrated in FIGS. 2 and 3, the cell tray 20, the snap segments 29, and the tray fasteners 40 are injection molded from an electrically nonconductive polymeric material and, thus, form a monolithic component. The cell tray, the snap segment, and the tray fastener that are formed as a monolithic unit may be made of a light-weight material such as aluminum or carbon fiber reinforced plastic.

Referring to FIG. 3, the cell tray 20 further includes a bottom surface 21 with a central opening 22 extending along a longitudinal direction of the cell tray 20, for example, perpendicular to the drawing plane of FIG. 3. The bottom surface 21 includes a first ledge 21a protruding inwardly from the first side surface 25 and a second ledge 21b protruding inwardly from the second side surface 26. The first ledge 21a and the second ledge 21b together support the battery cells 10 inserted into the cell tray 20.

Figure 4:
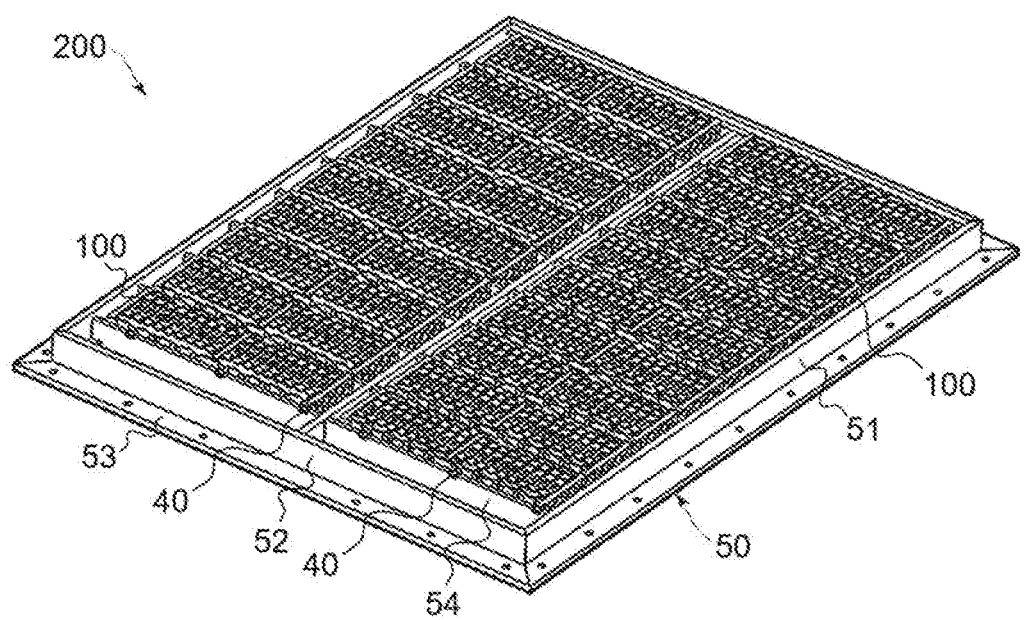
FIG. 4 is a perspective view of a battery system according to an embodiment of the present invention.

Referring to FIG. 4, a battery system 200 according to an embodiment of the present invention includes a plurality of the battery submodules 100 as illustrated in FIGS. 2 and 3. A plurality of rows (e.g., two rows) of the battery submodules 100, each row including a plurality of the battery submodules 100, are disposed in a battery system carrier 50. The battery system carrier 50 includes a plurality of longitudinal beams 51 (e.g., two longitudinal beams 51) that are disposed at an arbitrary interval and a plurality of crossbeams 52 (e.g., two crossbeams 52) disposed at an arbitrary interval while crossing the plurality of longitudinal beams 51 to form a carrier frame. The plurality of longitudinal beams 51 and the plurality of crossbeams 52 may be coupled to each other by welding. A ground plate 53 is coupled to the carrier frame by welding and the like such that a combination body is formed, and the combination body may be provided as a cap-shaped battery system carrier 50 including a bottom. The battery system carrier 50 further includes a plurality of support beams 54, and the tray fasteners 40 of each of the battery submodules 100 are attached to the support beams 54. The plurality of support beams 54 shown in FIG. 4 are connected to the longitudinal beams 51, the plurality of crossbeams 52, and the ground plate 53 and then coupled thereto by welding and the like. The support beams 54 disposed along the plurality of crossbeams 52 are disposed at opposite sides of the battery submodule 100.

Figure 5:
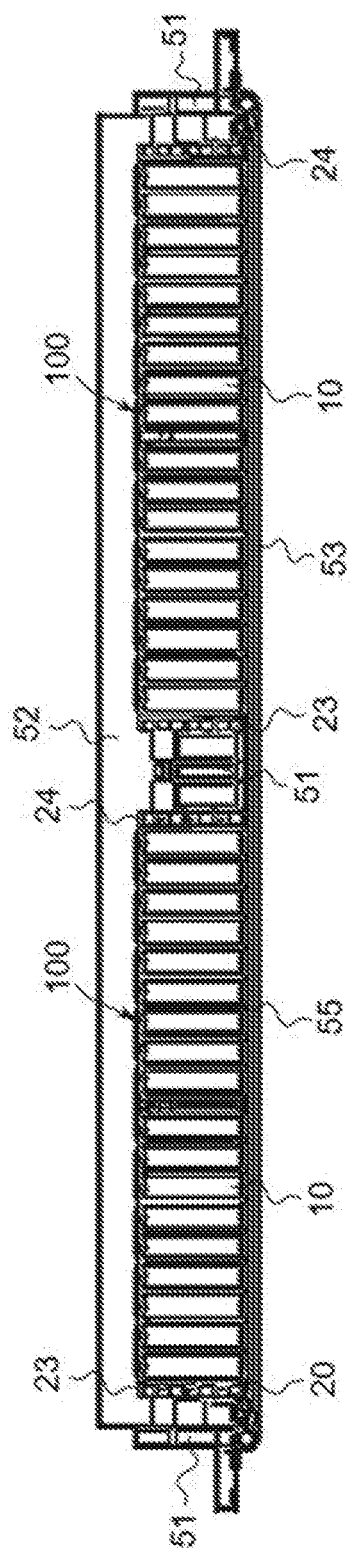
FIG. 5 is a cross-sectional view of a battery system according to an embodiment of the present invention.

Referring to FIGS. 4 and 5, the ground plate 53 of the battery system carrier 50 includes a coolant channel 55 as an integral part (e.g., the coolant channel 55 is integrally formed in the ground plate 53). The coolant channel 55 forms cooling areas at where the coolant channel 55 has a plurality of windings for providing a large heat exchange surface. The battery submodules 100 are arranged in the battery system carrier 50 such that the central openings 22 of the cell trays 20 are aligned with the cooling areas formed by the coolant channel 55. In other embodiments, the coolant channels may be external coolant channels that are attached to the battery system carrier 50.

Figure 6:
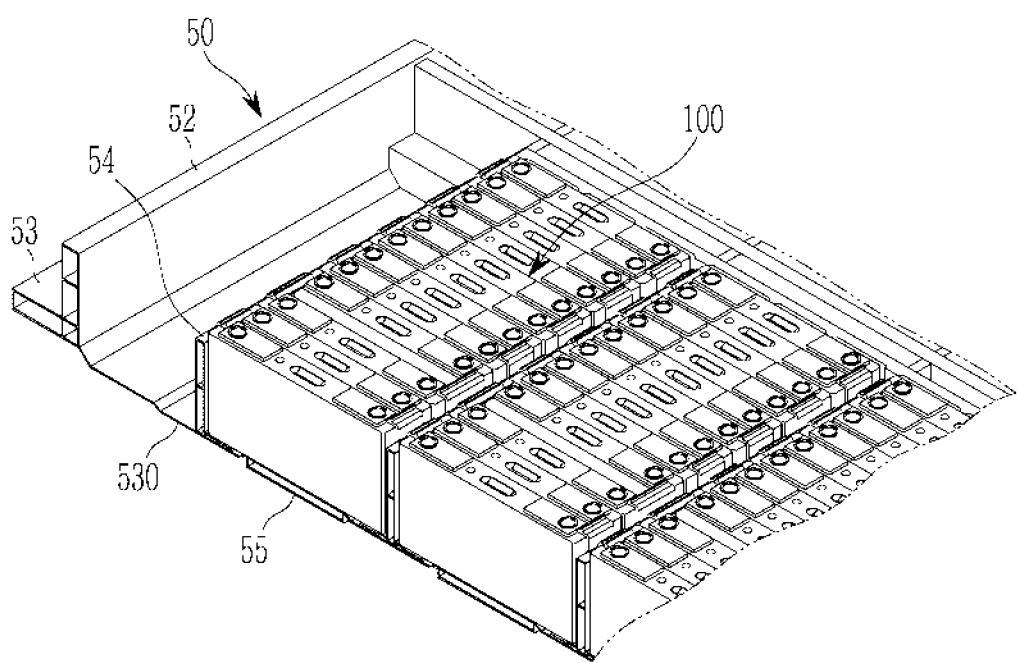
FIG. 6 is a partial cut-away perspective view of a battery system according to an exemplary embodiment of the present invention.

FIG. 6 is a partial cut-away perspective view of the battery system according to an exemplary embodiment of the present invention. As shown in FIG. 6, as previously described, the battery system carrier 50 has a structure formed by combining a plurality of longitudinal beams (not shown), a plurality of crossbeams 52, and a ground plate 53 by welding. A plurality of battery submodules 100 are aligned in a plurality of rows at a bottom 530 of the ground plate 53, and support beams 54 are disposed at opposite sides of each battery submodule 100 to support the battery submodule 100.

A coolant channel 55 is provided at an outer side of the bottom 530 of the ground plate 53. The coolant channel 55 may be provided as a coolant pipe. In detail, the coolant channel 55 is provided as a sheet-shaped pipe through which a coolant can flow and is fixed to the ground plate 53 by welding. In this case, the coolant channel 55 may be disposed facing an opening of a cell tray of each battery submodule 100, that is, a central opening of the cell tray of each battery submodule 100.

In the present exemplary embodiment, since the battery submodules 100 are provided in the battery system carrier 50 in a manner that the central opening of the cell tray faces a bottom side of the cell tray, that is, the bottom of the ground plate 53, the coolant channel 55 is provided in the bottom of the ground plate 53. As another exemplary embodiment, when the central opening of the cell tray is provided in a side surface of the cell tray, the coolant channel may be provided in the battery system carrier 50 so as to face such a central opening of the cell tray.

Figure 7:
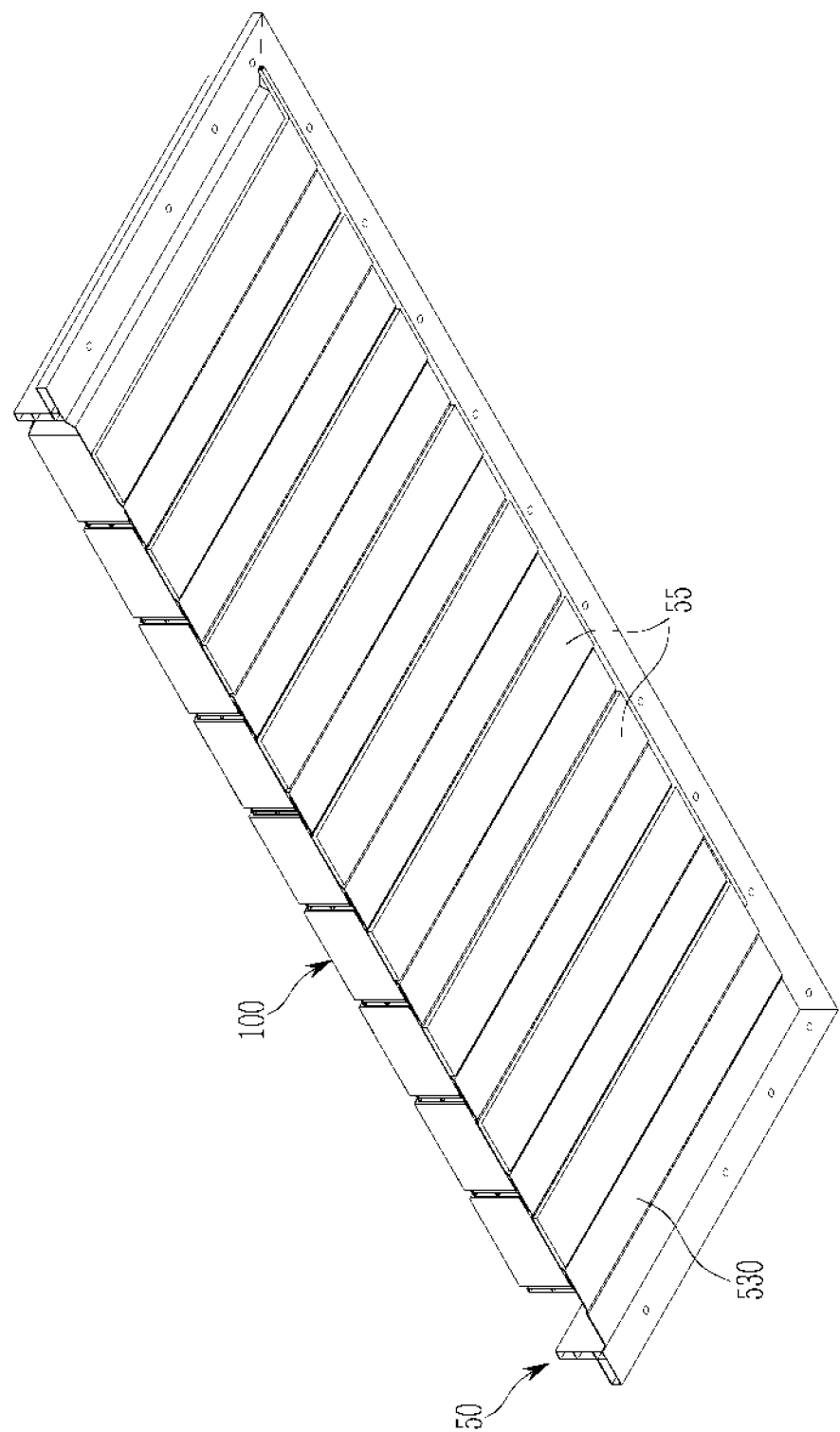
FIG. 7 is a partial cut-away rear perspective view of the battery system according to the exemplary embodiment of the present invention.

FIG. 7 shows a structure in which the coolant channel 55 is disposed corresponding to each row of the battery submodules 100 that are provided in the battery system carrier 50. In FIG. 7, one coolant channel 55 is disposed with respect to one row of the battery submodules 100, but more than one coolant channel may be disposed corresponding to one row of the battery submodule 100, and in this case, the plurality of coolant channels may be provided to not only be separated from each other (e.g., stripes) but also to be connected with each other (e.g., meandering).

Figure 8:
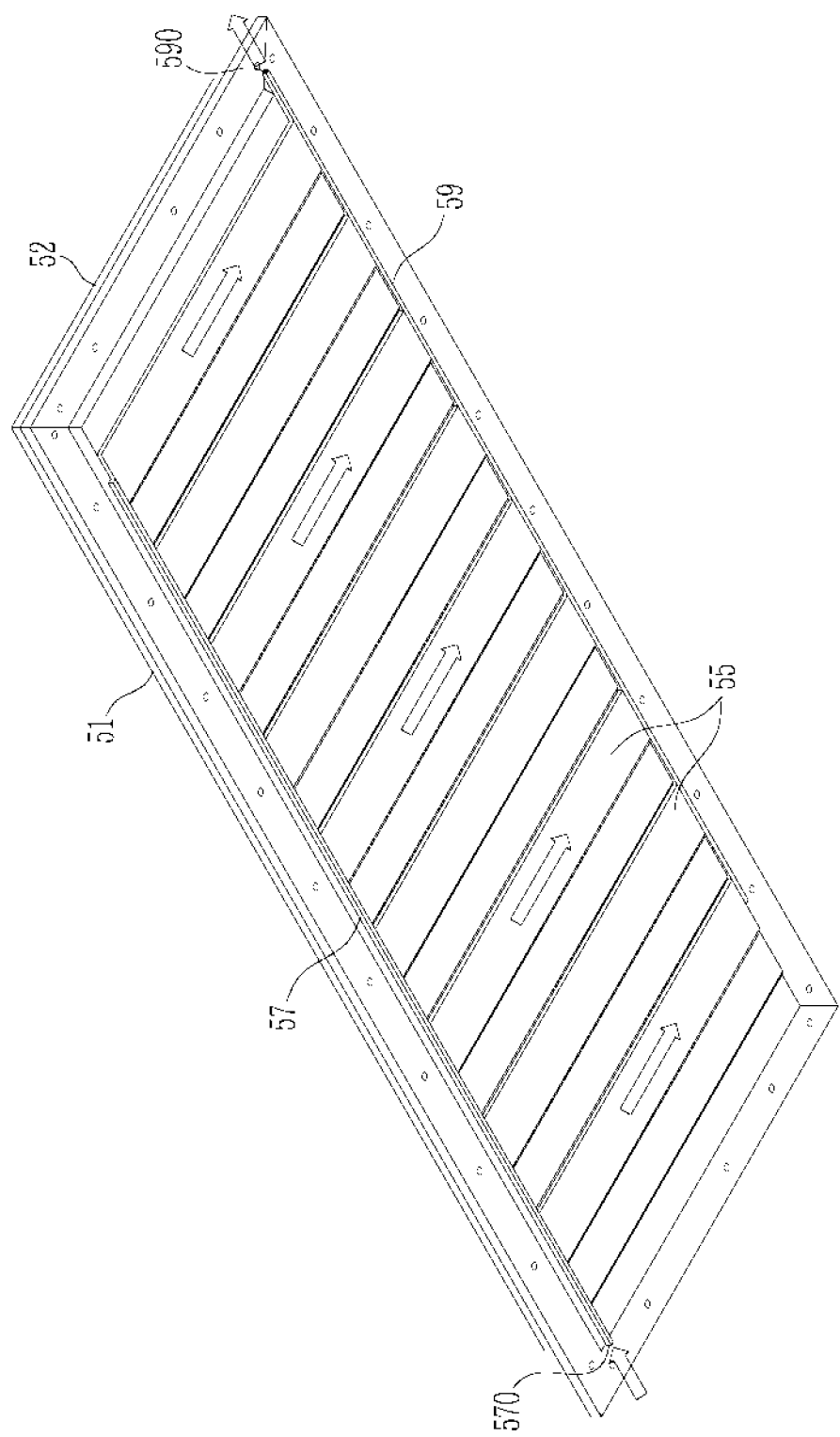
FIG. 8 is a rear perspective view of the battery system according to the exemplary embodiment of the present invention.

FIG. 8 shows a structure in which a coolant inlet distribution pipe 57 and a coolant outlet distribution pipe 59 are connected to the plurality of coolant channels 55. A coolant (e.g., a coolant for a vehicle) flowing through the coolant inlet distribution pipe 57 via an inlet 570 of the coolant inlet distribution pipe 57 cools the battery cells of the battery submodules 100 while passing through the respective coolant channels 55, and is exhausted to a predetermined place through an outlet 590 of the coolant outlet distribution pipe 59.

To this end, the coolant channels 55 are disposed along the crossbeams 52, and the coolant inlet distribution pipe 57 and the coolant outlet distribution pipe 59 are disposed along the longitudinal beams 51 and fixed to an outer side of the bottom 530 of the ground plate 50.

Figure 9:
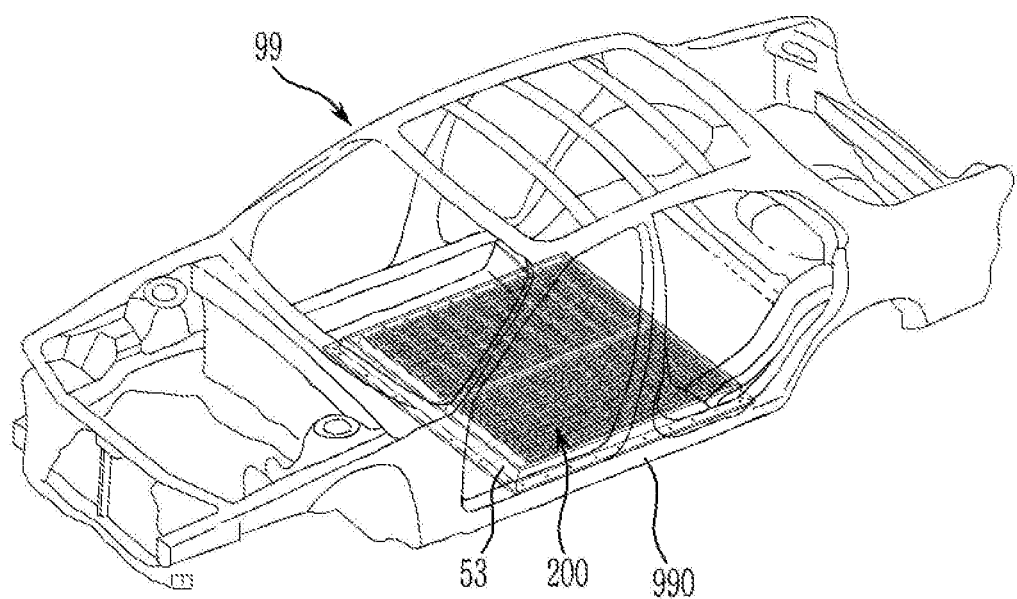
FIG. 9 is a schematic diagram of an example of application of the battery system according to the exemplary embodiment of the present invention to a vehicle.

FIG. 9 is a schematic diagram of application of the battery system according to the exemplary embodiment of the present invention to a device, for example, a vehicle. As shown in FIG. 9, the battery system 200 may be applied to a vehicle by detachably installing the ground plate 53 to a part of a vehicle frame 99, for example, an underbody 990 of the vehicle frame 99.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery system comprising:
  a plurality of monolithic cell trays configured to accommodate a plurality of aligned battery cells, wherein each cell tray of the plurality of cell trays comprises;
    a plurality of cell retainers configured to retain the battery cells in the cell tray by being connected to the battery cells and the cell tray; and
    a plurality of tray fasteners monolithic with the cell tray,
    wherein the cell tray defines an opening that exposes the plurality of battery cells when the cell tray is accommodating the plurality of battery cells;
  a cap-type battery system carrier configured to accommodate the plurality of cell trays therein, wherein the battery system carrier comprises coolant channels configured to cool the plurality of battery cells;
  wherein the plurality of tray fasteners in each cell tray are connected with the battery system carrier to install the plurality of cell trays in the battery system carrier; and
  wherein a coolant channel of the coolant channels of the battery system carrier faces the opening of at least one cell tray of the plurality of cell trays.

2. The battery system according to claim 1,
  wherein the coolant channels are provided in an outer side of the battery system carrier.

3. The battery system according to claim 1,
  wherein the battery system carrier comprises:
  a plurality of longitudinal beams;
  a plurality of crossbeams crossing the plurality of longitudinal beams;
  a ground plate comprising a bottom; and
  support beams connected with the ground plate and the plurality of longitudinal beams or the ground plate and the plurality of crossbeams,
  wherein the coolant channel comprises a plurality of coolant pipes provided in the ground plate.

4. The battery system according to claim 3,
  wherein the plurality of coolant pipes are connected to inlet distribution pipes and outlet distribution pipes that are provided in the ground plate.

5. The battery system according to claim 4,
  wherein the coolant pipes are disposed along the crossbeams, and the inlet distribution pipes and the outlet distribution pipes are along the longitudinal beams.

6. The battery system according to claim 3,
wherein the tray fasteners are connected to the support beams.

7. The battery system according to claim 3,
wherein the opening of the cell tray of the plurality of cell trays is a central opening provided in a bottom surface of each cell tray along a longitudinal direction of each cell tray, and the coolant channels are aligned while respectively matching the central openings of the plurality of cell trays.

8. The battery system according to claim 1,
wherein the cell retainers of at least one cell tray of the plurality of cell trays are monolithic with said cell tray.

9. The battery system according to claim 8,
wherein said cell tray, the cell retainers of said cell tray, and the tray fastener of said cell tray are injection molded from an electrically nonconductive polymeric material.

10. The battery system according to claim 8,
wherein said cell tray, the cell retainers of said cell tray, and the tray fasteners of said cell tray comprise aluminum or carbon fiber reinforced plastic.

11. The battery system according to claim 1, further comprising the plurality of battery cells,
wherein each of the plurality of battery cells has two opposing wide side surfaces, two opposing narrow side surfaces, and opposing top and bottom surfaces, and
wherein, in at least one cell tray of the plurality of cell trays, the plurality of battery cells are stacked together with their wide surfaces facing each other.

12. The battery system according to claim 1,
wherein at least one cell tray of the plurality of cell trays has a box shape that comprises a bottom surface defining a central opening and said cell tray defines a top opening that faces the central opening.

13. The battery system according to claim 12,
wherein the central opening extends along a longitudinal direction of said cell tray.

14. The battery system according to claim 1,
wherein each cell tray of the plurality of cell trays comprises a bottom surface, a first side surface, a second side surface, a first ledge perpendicularly protruding inwardly from the first side surface, and a second ledge perpendicularly protruding inwardly from the second side surface, and
wherein the first ledge and the second ledge are configured to support the plurality of battery cells.

15. A battery system comprising:
a plurality of monolithic cell trays configured to accommodate a plurality of aligned battery cells, wherein each cell tray of the plurality of cell trays comprises:
a plurality of cell retainers configured to retain the battery cells in the cell tray by being connected to the battery cells and the cell tray; and
a plurality of tray fasteners monolithic with the cell tray,
wherein the cell tray defines an opening that exposes the plurality of battery cells when the cell tray is accommodating the plurality of battery cells;
a cap-type battery system carrier configured to accommodate the plurality of cell trays therein, wherein the battery system carrier comprises coolant channels configured to cool the plurality of battery cells;
wherein the plurality of tray fasteners in each cell tray are connected with the battery system carrier to install the plurality of cell trays in the battery system carrier;
wherein a coolant channel of the coolant channels of the battery system carrier faces the opening of at least one cell tray of the plurality of cell trays,
wherein at least one cell tray comprises a first side surface and a second side surface,
wherein the first side surface has a first lower portion and a first upper portion,
wherein the second side surface has a second lower portion and a second upper portion,
wherein the plurality of cell retainers of said cell tray are formed of a plurality of spaced apart snap segments that extend upwardly from at least one of the first upper portion or the second upper portion and are elastically connected to the first lower portion or second lower portion, and
wherein each of the snap segments is configured to provide clip engagement with at least one of the plurality of battery cells accommodated in said cell tray.

16. The battery system according to claim 1,
wherein at least one cell tray comprises a first end surface and a second end surface, and
wherein at least one of the first end surface and the second end surface comprises a reinforcing structure.

17. The battery system according to claim 16,
wherein the reinforcing structure comprises a honeycomb structure.

18. A vehicle comprising the battery system according to claim 1.

19. The vehicle according to claim 18,
wherein the battery system carrier comprises:
a plurality of longitudinal beams;
a plurality of crossbeams crossing the plurality of longitudinal beams;
a ground plate forming a bottom, the bottom being connected with the plurality of longitudinal beams and the plurality of crossbeams; and
support beams connected with the ground plate, the plurality of longitudinal beams, and/or the plurality of crossbeams, and
wherein the ground plate is detachably fixed to a vehicle body.

20. The battery system according to claim 1, wherein each cell tray of the plurality of cell trays further comprises an open side into which the plurality of battery cells are inserted when the cell tray accommodates the plurality of battery cells, and
wherein the tray fasteners extend from at least one side of the cell tray adjacent to the open side.

* * * * *

UNITED STATES PATENT AND TRADEMARK OFFICE
CERTIFICATE OF CORRECTION

PATENT NO. : 11,139,521 B2
APPLICATION NO. : 15/642167
DATED : October 5, 2021
INVENTOR(S) : Ralph Wuensche et al.

It is certified that error appears in the above-identified patent and that said Letters Patent is hereby corrected as shown below:

In the Claims

| | |
|---|---|
| Column 12, Line 27, Claim 1 | delete "comprises;" and insert -- comprises: -- |
| Column 12, Line 50, Claim 3 | after "carrier" insert -- further -- |
| Column 12, Line 58, Claim 3 | delete "channel comprises" and insert -- channels comprise -- |
| Column 12, Line 65, Claim 5 | after "are" delete "disposed" |
| Column 13, Line 5, Claim 7 | delete "the cell" and insert -- each cell -- |
| Column 13, Line 16, Claim 9 | delete "fastener" and insert -- fasteners -- |
| Column 14, Line 23, Claim 15 | after "portion," insert -- respectively, -- |

Signed and Sealed this
Twenty-ninth Day of November, 2022

Katherine Kelly Vidal
*Director of the United States Patent and Trademark Office*